United States Patent [19]

Kunz

[11] Patent Number: 4,872,522

[45] Date of Patent: Oct. 10, 1989

[54] ELECTRONIC WEIGHING APPARATUS INCLUDING GUIDE ADJUSTING MEANS

[75] Inventor: Peter Kunz, Gossau, Switzerland

[73] Assignee: Metter Instrumente AG, Greifensee, Switzerland

[21] Appl. No.: 283,828

[22] Filed: Dec. 13, 1988

[30] Foreign Application Priority Data

Feb. 19, 1988 [CH] Switzerland ............................ 621/88

[51] Int. Cl.⁴ ......................... G01G 3/08; G01G 23/14
[52] U.S. Cl. ...................................... 177/229; 177/164
[58] Field of Search ......................... 177/164, 229, 212

[56] References Cited

U.S. PATENT DOCUMENTS

| | | |
|---|---|---|
| 4,043,415 | 8/1977 | Luchinger . |
| 4,184,557 | 1/1980 | Kunz .................................... 177/229 |
| 4,311,202 | 1/1982 | Kunz . |
| 4,337,838 | 7/1982 | Kunz . |
| 4,429,757 | 2/1984 | Kunz . |
| 4,440,251 | 4/1984 | Kunz . |
| 4,545,448 | 10/1985 | Kunz . |
| 4,627,505 | 12/1986 | Kunz . |
| 4,653,600 | 3/1987 | Melcher et al. ...................... 177/229 |
| 4,798,251 | 1/1989 | Maaz et al. ...................... 177/164 X |

Primary Examiner—George H. Miller, Jr.
Attorney, Agent, or Firm—Laubscher, Presta & Laubscher

[57] ABSTRACT

Electronic weighing apparatus includes an adjusting arrangement for vertically adjusting relative to the scale frame at least one of the resilient bending bearings that supports one end of a guide member of the parallelogram arrangement that guides the load receiver for vertical movement relative to the frame. Preferably, the adjusting device includes a cantilevered resilient auxiliary guide plate arranged in parallel relation between the upper guide member and the frame; the upper guide member being arranged in a recess contained in the adjacent surface of the guide plate. At its end, adjacent the load receiver, the cantilevered guide plate is connected with the frame. At its opposite end, the guide plate extends in spaced relation to the frame, an adjusting screw being provided for vertically adjusting the opposite end portion relative to the frame as well as the bending bearing associated therewith. Cover members are provided for covering the recess and the guide members to facilitate uniform temperature distribution in both guide members.

7 Claims, 2 Drawing Sheets

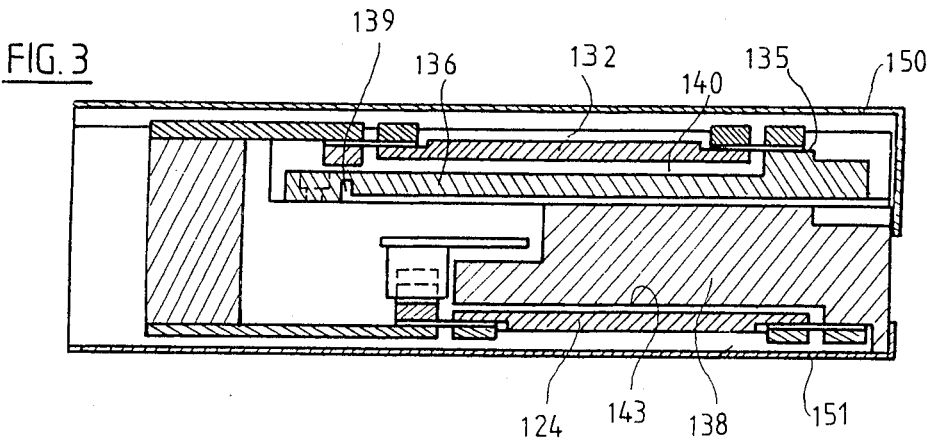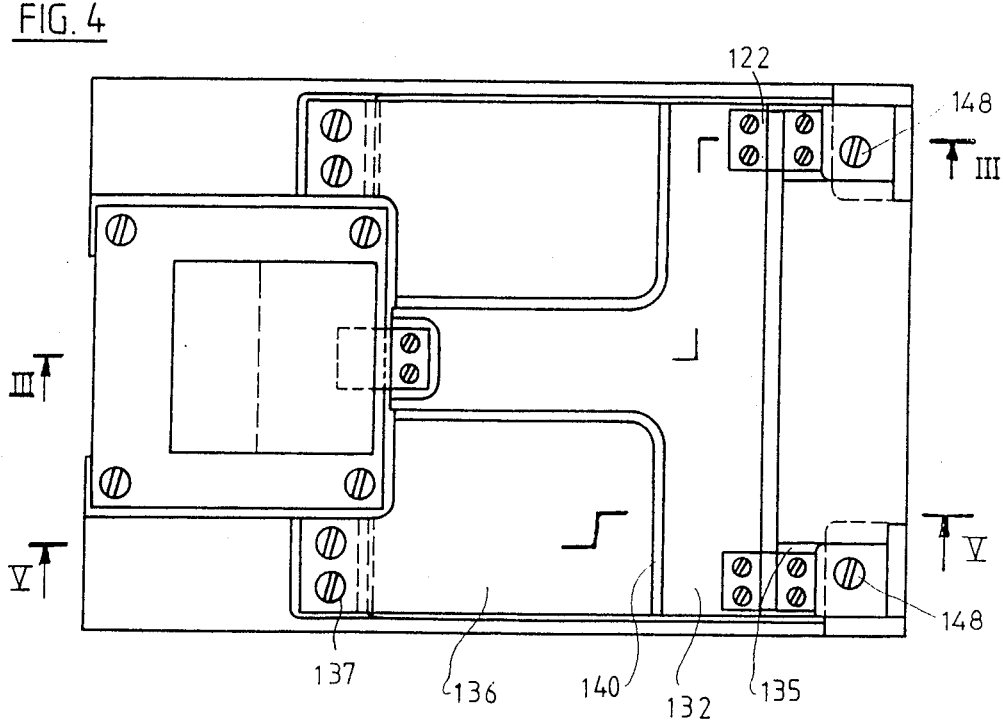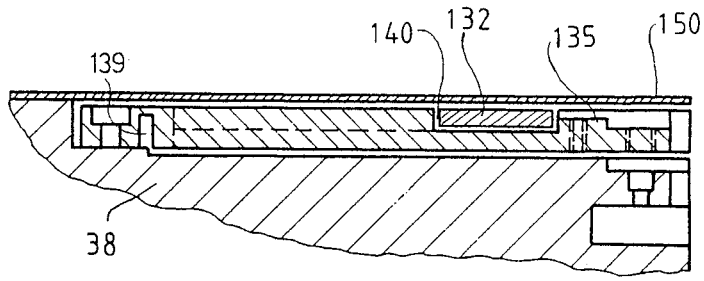

ELECTRONIC WEIGHING APPARATUS INCLUDING GUIDE ADJUSTING MEANS

BRIEF DESCRIPTION OF THE PRIOR ART

Weighing systems of the electromagnetic load compensation type are well known in the patented prior art, as evidenced by the prior patents to Luechinger U.S. Pat. Nos. 4,043,415, Kunz 4,184,557, 4,311,202, 4,337,838 and 4,429,757, 4,545,448 and 4,627,505, among others. As shown by these Kunz patents, it is known to provide parallelogram guide means with resilient bending bearings for guiding the load receiving member for vertical movement relative to the stationary frame.

The present invention was developed to provide an electronic scale with a load receiver which is guided for parallel movement with respect to a scale frame by a parallelogram arrangement including upper and lower guide members attached to the load receiver and to the scale frame, by bending bearings, respectively, at least one of the fastening surfaces for one bending bearing being adjustable on the scale frame in terms of height.

In electronic scales whose load receivers are guided in a parallel manner by means of guides, it is desired to adjust the guide mounting means for accurately setting the parallelogram components in their proper vertical positions so that corner load errors which occur upon the eccentric placement of the weighing material on the platform of the scale can be minimized.

A scale of the prior art is disclosed in the inventor's U.S. Pat. No. 4,184,557 (Swiss Pat. No. 625,617) wherein the placement and assembly surfaces (in short, the mounting surfaces of the guides) each consist of one flexible tongue attached through an opening in the scale frame and adjustable in terms of height by means of a differential screw. The tongue is bent by the differential screw, and as a result, the mounting surface will swing, on the one hand, like a hinge, essentially parallel to the slit, which, in turn, influences the weighing result negatively in only a moderate fashion whereas, on the other hand, however, there is also an uncontrollable lateral inclination of the tongue and thus also of the guide end resting smoothly upon this fastening surface. This lateral inclination is caused by the differential screw whose clamping force, as a result of a placement position distributed irregularly over the circumference of the thread courses, does not run with the taphole in the tongue along the axis of rotation but rather laterally thereto. This lateral inclination leads to a bracing of the guides and causes forces in the guide which also run parallel to the load receiver and which can thus adversely affect the weighing result.

In the Luechinger U.S. Pat. No. 4,043,415, another device is disclosed for preventing corner load errors, wherein the mounting means of the guides are adjusted in terms of height by vertical shifting of the mounting surface along a vertically extending guide sleeve. The mounting of the guides is less critical here, but in this scale likewise the different heat expansion characteristics (on the one hand, of the guides and, on the other hand of the housing parts supporting the guides) influence the position of the mounting surfaces during the warm-up phase after the scale has been turned on and, in case of one-sided heat or cold action, through heat sources contained inside the scale as well as through the sun or heating devices or by means of open windows in the room where the scale is utilized.

The present invention was developed to remedy this situation by providing means for adjustably connecting the guide members with the frame, whereby the deleterious effects of improper setting of the parallelogram linkage or variations in tolerances resulting from individual structural components having uneven thermal characteristics are eliminated, thereby to avoid error sources of major proportions.

SUMMARY THE INVENTION

According to the present invention, means are provided for vertically adjusting relative to the weighing apparatus frame at least one of the resilient bending bearing means that connects a guide member to the frame, use being made of a resilient cantilevered auxiliary guide plate connected at its opposite ends with the frame and with said one bending bearing means, respectively. Adjusting means are provided for vertically adjusting the free end of the guide plate, and consequently said one bending bearing connected thereto, relative to the frame.

By means of the auxiliary guide plate according to the invention, which is preferably made of the same material as the parallelogram guide members, it is possible to eliminate the uncontrollable tension force components issuing from the differential screws, and to furthermore guarantee a parallel course of the expansion of elements that influence each other mutually.

The inherently stable design of the auxiliary guide plate, during the setting of the mounting surfaces for the bending bearings, prevents an uncontrollable lateral inclination because a local bending resulting from the differential screws does not lie within the measurable range.

In accordance with more specific objects of the invention, by virtue of the preferably complete embedding of the guide in a recess in the auxiliary guide containing the shape of the guide, as well as the encapsulation of the guide with a cover above the recess, there is provided a parallel temperature curve for the cooperating structural components. Position changes are compensated for completely in this fashion.

BRIEF DESCRIPTION OF THE DRAWINGS

Other objects and advantages of the invention will become apparent from a study of the following specification when viewed in the light of the accompanying drawing, in which:

FIG. 3 is a longitudinal sectional view of the preferred embodiment of the invention taken along line III—III of FIG. 4;

FIG. 4 is a top plan view, with certain parts removed, of the apparatus of FIG. 3; and FIG. 5 is a detailed view taken along line V—V of FIG. 4.

DETAILED DESCRIPTION

Figure 1:
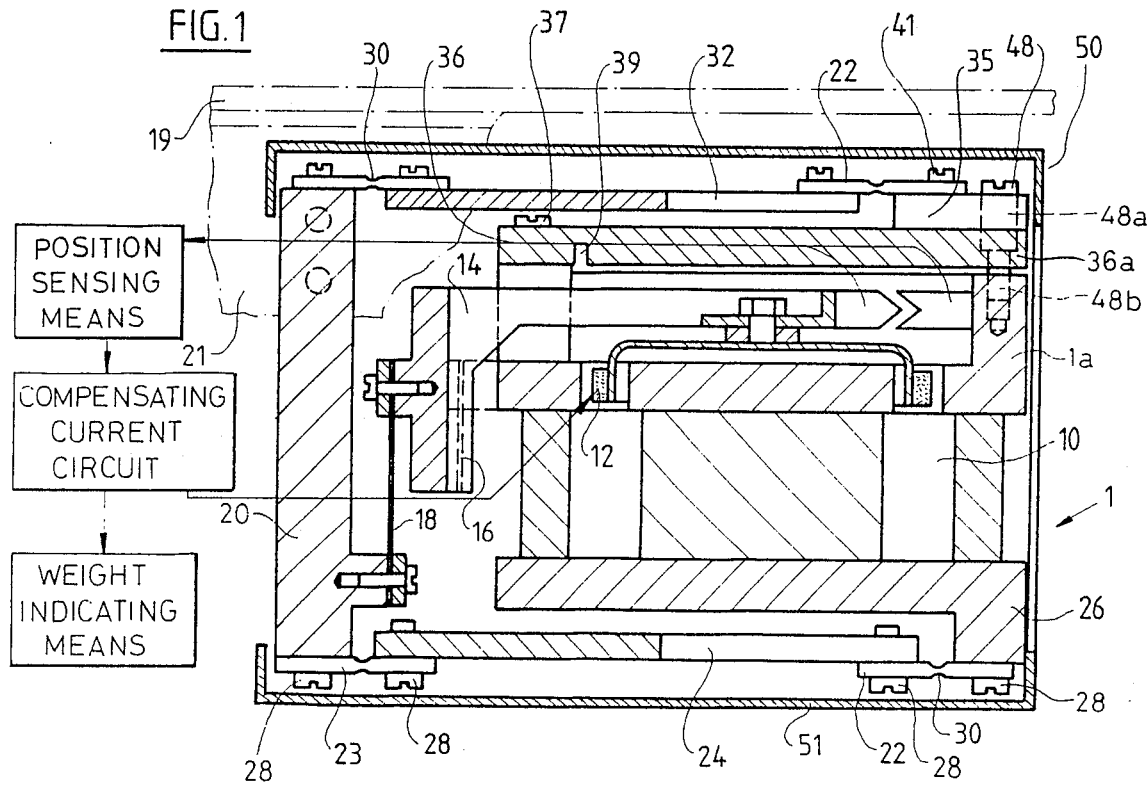
FIG. 1 is a longitudinal sectional view of a first embodiment of the weighing apparatus taken along line I—I of FIG. 2.

The examples illustrate embodiments of weighing apparatus of the type including electromagnetic load compensation such as is shown for example, in the aforementioned U.S. Pat. No. 4,184,557. To the extent that the present design agrees with that known scale, it will be discussed only in a summary fashion here.

Scale frame 1 comprises a fixed permanent magnet system 10 in whose air gap is arranged a coil 12 through which current flows. The latter is mounted on a support lever 14 which is pivotally suspended from the frame by means of bending bearings 16. Another bending bearing 18 connects lever 14 with a load receiver 20 which in turn is connected with scale frame 1 by means of upper and lower parallel guide members 32 and 24, respectively.

For simplicity, the electrical measuring system as well as other conventional elements which are not relevant with regard to the present invention (housing, display, stops, etc.) have been omitted in order to bring the essential arrangements out more clearly. Only a dot-dash line is used to indicate a rectangular weighing plate or weighing pan 19 which receives the weighing material and which is connected with the ends of the load receiver 20 via screw-connected angle supports 21.

The load receiver 20 is designed as a generally rectangular block-shaped structural part. At its lower end there is mounted, via a resilient bending bearing 23, the lower guide 24 whose other end is threadably connected—via two additional resilient bending bearings 22—with a fixed protrusion 26 of the stationary permanent magnet system 10 (or alternatively, of the scale frame 1). All bending bearings 22, 23 are rigidly fastened, by means of screws 28, to the associated counterpart (guide 24, load receiver 20, or scale frame 1). Bending bearings 22, 23 contain grooves 30 which define their bending axes.

Figure 2:
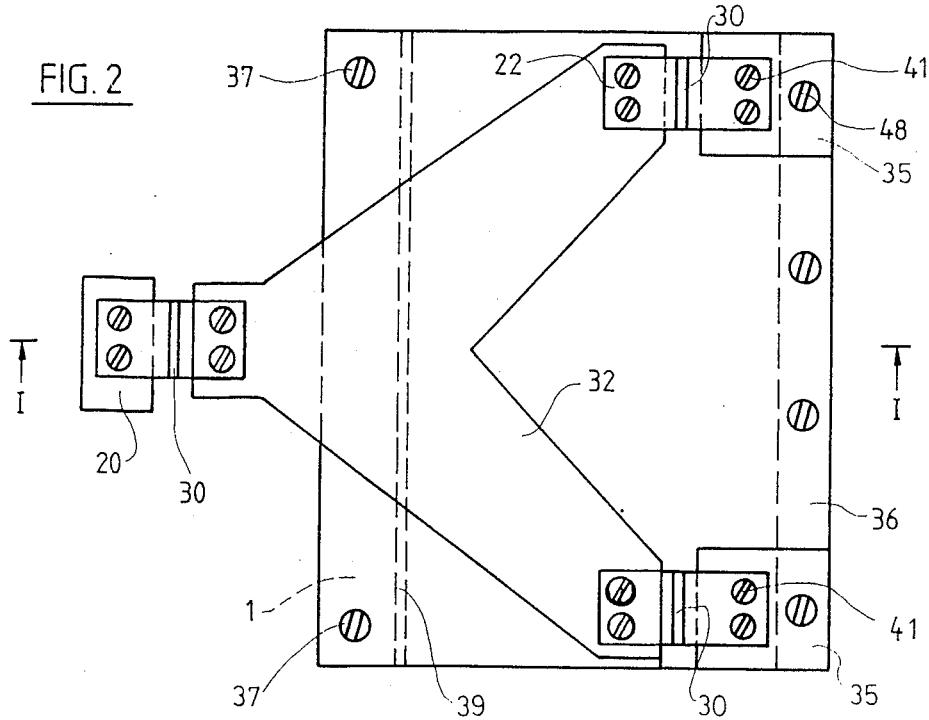
FIG. 2 is a top plan view, with certain parts removed for clarity, of the apparatus of FIG. 1.

Lower guide 24 has a T-shaped or Y-shaped configuration in the known manner (as shown, for example, in FIG. 2).

The upper guide 32 is, on the one hand, connected at one end with the load receiver 20 in the traditional manner analogous to the lower guide 24, but, in accordance with the present invention, at its other end, it is fastened to a cantilevered guide plate 36 instead of being fastened directly on frame 1. This auxiliary guide plate 36 consists of a generally rectangular guide plate one edge portion of which is rigidly fastened on frame 1 by means of screws 37. The opposite edge portion of the cantilevered guide plate projects freely above the frame portion 1a. The upper guide member 32 is connected with raised corner portions 35 of the auxiliary guide plate 36 via screws 41 and bending bearing 22. Auxiliary guide plate 36 contains a groove 39 in the area of screws 37, which groove defines the bending axis of the auxiliary guide plate 36.

Auxiliary guide plate 36—which is arranged at a spaced interval from, and essentially parallel with guide member 32—is adjustable in terms of height relative to the frame by means of two differential screws 48 on the nonfastened, freely extending cantilevered portion, that is to say, with respect to frame 1. More particularly, the cylindrical headed portions 48a of differential screws 48 are received in corresponding counterbores formed in the upper surfaces of the corner portions 36a, respectively, and the threaded shank portions 48b with different pitch extend within threaded bores contained in the lower corner portions 36a and in the frame portion 1a, respectively. As a result of this, the vertical position of the bending bearing 22, and upper guide 32 fastened thereto, can be precisely set via the threads of the differential screw 48 (FIG. 1), thereby avoiding the drawbacks of the known devices mentioned above.

In a preferred alternative version of the invention according to FIGS. 3 to 5, which facilitates a lower structural height for the scale, there is arranged in the upper surface of auxiliary guide plate 136 a T-shaped recess 140 that receives a T-shaped upper guide 132 with universal play. Fastening corner portions 135 are likewise set off with respect to the upper surfaces of auxiliary guide plate 136 so that bending bearings 122 likewise do not substantially protrude over the upper edge of recess 140.

The lower guide member 124 is inserted into a recess 143 in the measurement cell housing 138 to which guide 124 is fastened.

Attached over both recesses 140, 143 are covers 150 and 151, respectively, which essentially completely encapsulate guides 124 and 132 with auxiliary guide 136 or in the housing bottom. Guides 124 and 132 consequently at all times take on the same temperature as the housing parts surrounding them, or, like the auxiliary guide plate 136 receiving the latter, because there cannot be any substantial air circulation. Covers 150 and 151 extend only over the recess 140 and 143, or alternatively over the entire housing surface.

In both of the preferred embodiments, essential elements such as the guide members 24 (124) and 32 (132), respectively, the auxiliary guide plate 36 (136), and the lever 14 are preferably made from light metal, such as an aluminum alloy.

For greater clarity, the electronic components have not been illustrated in FIGS. 3 to 5.

While, in accordance with the Patent Statutes, the preferred forms and embodiments have been illustrated and described, the invention may be modified and changed without deviating from the inventive concepts set forth above.

What is claimed is:

1. In an electronic weighing apparatus of the type including parallelogram guide means for guiding a load receiver (20) for vertical movement relative to a frame (1), said guide means including horizontal parallel spaced upper and lower guide members (32,24), and first (22) and second (23) resilient bending bearing means connecting said guide members with said frame and with said load receiver, respectively, the invention which comprises: means for vertically adjusting the position of at least one of said first bending bearing means relative to said frame, said adjusting means including:
    (a) a generally rectangular resilient cantilevered auxiliary guide plate (36) arranged adjacent and parallel with one of said guide members, said guide plate having a relatively low distortion characteristic and carrying at one end said at least one first bending bearing;
    (b) means (37) connecting the other end of said guide plate with said frame, said auxiliary guide plate containing a continuous single horizontal groove (39) that extends transversely the entire width of said guide plate for defining therein an axis of bending extending normal to the direction between said one and other ends of said guide plate;
    (c) means (41) connecting said one bending bearing with said one guide plate end; and
    (d) means (48) for vertically adjusting said one guide plate end relative to said frame.

2. Apparatus as defined in claim 1, wherein said one guide member is the upper guide member.

3. Apparatus as defined in claim 1, wherein said auxiliary guide plate and said guide members are formed of the same material.

4. In an electronic weighing apparatus of the type including parallelogram guide means for guiding a load receiver for vertical movement relative to a frame, said guide means including horizontal parallel spaced upper and lower guide members (132, 124), and first (122) and second resilient bending bearing means connecting said guide members with said frame and with said load receiver, respectively, the invention which comprises: means for vertically adjusting the position of at least one of said first bending bearing means relative to said frame, said adjusting means including:
  (a) a generally rectangular resilient cantilevered auxiliary guide plate (136) arranged beneath said upper guide member, said auxiliary guide plate containing in its upper surface a recess (140) that receives said upper guide member, said guide plate having a relatively low distortion characteristic and carrying at its one end said at least one first bending bearing;
  (b) means (137) connecting the other end of said guide plate with said frame;
  (c) means connecting said one bending bearing with said one guide plate end; and
  (d) means (148) for vertically adjusting said one guide plate end relative to said frame.

5. Apparatus as defined in claim 4, wherein the frame includes a portion that extends above said lower guide member and contains a recess (143) receiving said lower guide member.

6. Apparatus as defined in claim 4, and further including upper and lower cover members (150, 151) connected with said frame to enclose said guide members and the upper and lower portions of said frame, respectively.

7. Apparatus as defined in claim 6, wherein said cover members are connected with said frame to encapsulate and virtually prevent the circulation of air in the recesses (140, 143) that contain said guide members respectively.

* * * * *